No. 702,269. Patented June 10, 1902.
H. H. WESTINGHOUSE.
FLUID PRESSURE BRAKE.
(Application filed Apr. 1, 1902.)
(No Model.)

WITNESSES:
Jas. B. MacDonald

INVENTOR,
Henry H. Westinghouse
By E. F. Wright
Att'y.

THE NORRIS PETERS CO., PHOTO-LITHO., WASHINGTON, D. C.

UNITED STATES PATENT OFFICE.

HENRY H. WESTINGHOUSE, OF EDGEWOOD PARK, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 702,269, dated June 10, 1902.

Original application filed November 14, 1892, Serial No. 451,937. Divided and this application filed April 1, 1902. Serial No. 100,949. (No model.)

*To all whom it may concern:*

Be it known that I, HENRY H. WESTINGHOUSE, a citizen of the United States, residing in Edgewood Park, county of Allegheny, State of Pennsylvania, have invented or discovered a certain new and useful Improvement in Fluid-Pressure Brakes, of which improvement the following is a specification.

My invention relates to a fluid-pressure brake system, and has for its object to provide an improved construction of this type of apparatus having two or more brake-cylinders, the supply of fluid under pressure to the additional brake cylinder or cylinders being controlled by the emergency-piston of the triple-valve device. This improved construction is shown and described in my prior application, Serial No. 451,937, filed November 14, 1892, of which this application is a division.

My invention is particularly adapted to be employed on trains which are run at very high speed, since in this service a greatly-increased braking force is necessary to properly control the trains, especially in emergencies. In order to secure this increased braking effect in emergency applications, I provide, in addition to the usual auxiliary reservoir, triple valve, and brake-cylinder, one or more additional brake-cylinders, the supply of pressure to which is controlled by the emergency-valve or a valve operated by the emergency-piston, whereby during service applications the triple valve operates to supply fluid under pressure from the auxiliary reservoir to the first brake-cylinder in the ordinary way without charging the additional brake-cylinder; but when a very rapid reduction of train-pipe pressure is made for an emergency application the triple valve makes a further traverse and supplies pressure to the emergency-piston, which then opens the emergency-valve and admits fluid under pressure to the additional brake-cylinder, thus effecting the application of the brakes with maximum force. In connection with the additional brake-cylinder a means for obtaining a gradual reduction of pressure therein may be employed, if desired, so that after an emergency application the braking force may be gradually reduced to correspond with the reduced speed of the train.

The improvement claimed is hereinafter fully set forth.

Figure 1:
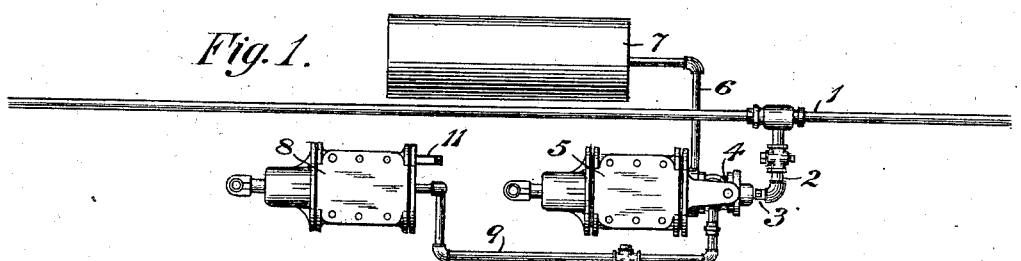
Figure 2:
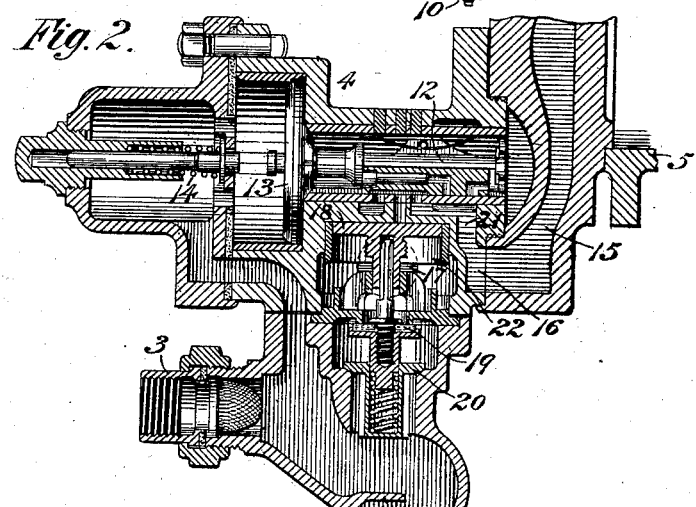
Figure 3:
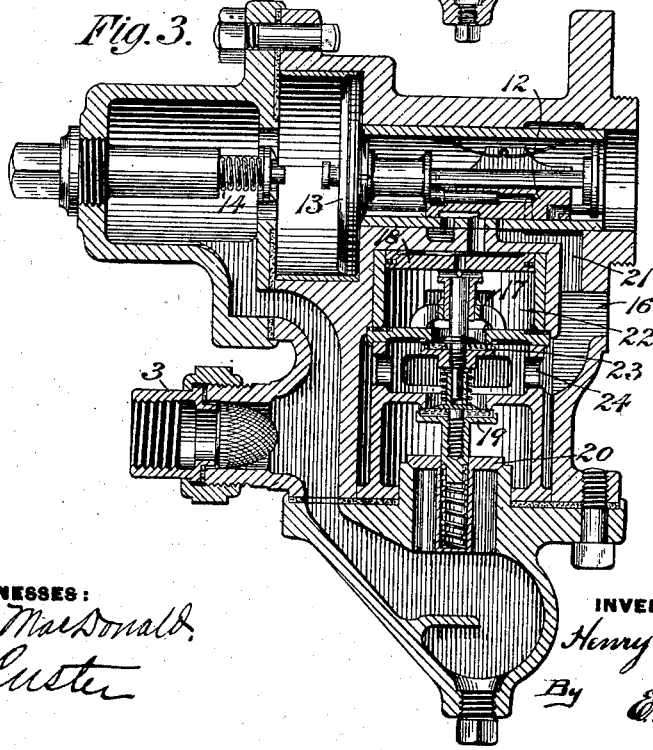

In the accompanying drawings, Figure 1 is a plan view showing one form of an apparatus adapted to the practice of my invention. Fig. 2 is a central longitudinal section through the triple valve and emergency-valve, and Fig. 3 is a similar view showing a modified arrangement.

The train-pipe 1 is connected, by means of branch pipe 2, with the nozzle 3 of the triple-valve device 4, the latter being connected to the brake-cylinder 5 and the pipe 6, leading from the auxiliary reservoir 7, as in the usual construction of the Westinghouse automatic air-brake system.

In addition to the above construction I provide the supplemental or additional brake-cylinder 8, which is connected by a pipe 9 with port 17 in the triple-valve device 4 and communicates with the chamber 22 beneath the emergency-piston 18. A valve 10 is placed in the pipe 9, between the two brake-cylinders 5 and 8, for the purpose of cutting off the communication to the additional brake-cylinder 8 whenever desired.

The construction of the triple-valve device, as shown in Fig. 2 of the drawings, corresponds substantially with that of the ordinary quick-action triple valve as now used in the Westinghouse system, with the exception that communication between the chamber 22 above the emergency-valve 19 and beneath the piston 18 and the passages 16 and 15, leading to the first brake-cylinder, is closed, while a port 17 establishes communication between said chamber 22 and the pipe 9, leading to the second or additional brake-cylinder 8.

In making service applications of the brake the operation of this device is the same as that of the usual construction—that is, a comparatively gradual reduction of pressure in the train-pipe causes the movement of the triple-valve piston 13 and slide-valve 12 and the opening of the graduating-valve, which permits a moderate flow of fluid from the auxiliary reservoir through the passages 21, 16, and 15 to the brake-cylinder 5; but in making emergency applications of the brake a sudden and rapid reduction of train-pipe pressure causes such a movement of the triple-valve piston and slide-valve as to compress the emergency-spring 14 and open the supply-port to the emergency-piston 18, which then opens the emergency-valve 19 and allows fluid under pressure in the train-pipe to open check-valve 20 and flow through port 17 and pipe 9 to the additional brake-cylinder 8. The pressure will then increase in brake-cylinder 8 until it is substantially equal to the train-pipe pressure, at which point the check-valve 20 is closed. In the meantime the first brake-cylinder is being charged from the auxiliary reservoir through the large direct port in the triple valve and the brakes are applied with their maximum force. The pressure in each brake-cylinder will then be slightly less than what it would be in a single brake-cylinder employed with the usual form of Westinghouse quick-action triple-valve device; but the combined pressures of the two brake-cylinders are considerably greater than can be secured in the case of the single brake-cylinder.

A small exhaust-outlet passage 11 is provided for the second brake-cylinder 8 in order to give a gradual reduction of the force with which the brakes are applied, and the size of this leakage port or passage is so proportioned as to secure the proper rate of reduction to correspond with the diminishing speed of the train and avoid sliding the wheels. A speed-governing device—such as shown, for instance, in Patent No. 218,149, issued to George Westinghouse August 5, 1879—may be used to control the outlet-passage 11, if desired.

Fig. 3 shows a modification in which the emergency-piston actuates two valves 19 and 23, and the space between these valves communicates, by means of openings 24, with the passage 16, leading to the first brake-cylinder 5. The operation of this form of my device is substantially the same as shown in Fig. 2, except that in emergency applications train-pipe fluid is admitted to the additional brake-cylinder through the openings controlled by valves 19 and 23, and some may also be supplied to the first brake-cylinder through the openings 24. In either case it will be observed the supply of fluid to the second or additional brake-cylinder is controlled by the movement of the emergency-piston, the supply of pressure to actuate said piston being governed by the movement of the triple valve.

Having now described my invention, what I claim as new, and desire to secure by Letters Patent, is—

1. In an air-brake system, the combination with the triple and emergency valves, of a second brake-cylinder controlled by said emergency-valve, substantially as set forth.

2. In an air-brake system, the combination with the triple and emergency valves, of a second brake-cylinder and a piston therein operated by train-pipe air and controlled by said emergency-valve, substantially as set forth.

3. In an air-brake system, the combination with the triple and emergency valves, of a chamber interposed between them, a port therein closed by the emergency-valve and an emergency brake-cylinder connected to said chamber to receive train-pipe air through the emergency-valve, substantially as set forth.

4. In an air-brake system, the combination with the triple and emergency valves, of a chamber below the emergency-valve piston, a port therein controlled by said emergency-valve, the rod connecting said piston and emergency-valve passing through said chamber, and a supplementary air-operated brake-piston connected to said chamber, substantially as described.

5. In an air-brake system, the combination with an auxiliary reservoir and a triple valve, of a brake-cylinder organized to receive air only from said reservoir through said valve, an emergency-valve and a supplementary brake-cylinder, arranged to receive train-pipe air through said emergency-valve only, substantially as described.

In testimony whereof I have hereunto set my hand.

H. H. WESTINGHOUSE.

Witnesses:
R. F. EMERY,
S. C. McCONAHEY.